(12) United States Patent
Jin et al.

(10) Patent No.: US 7,400,553 B1
(45) Date of Patent: Jul. 15, 2008

(54) ONE-RETURN WAVE EQUATION MIGRATION

(76) Inventors: Shengwen Jin, 3339 Double Lake Dr., Missouri City, TX (US) 77459; Shiyong Xu, 5605 Bissonnet St. #107, Houston, TX (US) 77081

( * ) Notice: Subject to any disclaimer, the term of this patent is extended or adjusted under 35 U.S.C. 154(b) by 110 days.

(21) Appl. No.: 11/606,551

(22) Filed: Nov. 30, 2006

(51) Int. Cl.
*G01V 1/36* (2006.01)
(52) U.S. Cl. .......................... 367/53; 367/50
(58) Field of Classification Search ............... 367/50, 367/51, 52, 53, 54
See application file for complete search history.

(56) References Cited

U.S. PATENT DOCUMENTS

| | | | |
|---|---|---|---|
| 5,138,584 A | 8/1992 | Hale | 367/53 |
| 5,274,605 A | 12/1993 | Hill | 367/53 |
| 5,490,120 A | 2/1996 | Li et al. | 367/53 |
| 5,530,679 A | 6/1996 | Albertin | 367/68 |
| 6,002,642 A * | 12/1999 | Krebs | 367/50 |

* cited by examiner

*Primary Examiner*—Ian J Lobo
(74) *Attorney, Agent, or Firm*—Russell J. Egan

(57) ABSTRACT

A one-return wave equation migration is used to extrapolate both down-going and up-going waves. Followed by a properly designed imaging condition, the partial image contributed form turning waves is correctly reconstructed. Numerical examples show that this method can significantly enhance definition of an overhanging salt boundary and a geological structure with vertical features.

10 Claims, 4 Drawing Sheets

ONE-RETURN WAVE EQUATION MIGRATION

BACKGROUND OF THE INVENTION

The Field of the Invention

The present invention pertains a one-return wave equation migration to extrapolate both down-going and up-going waves. Followed by properly designed imaging conditions, the partial images contributed from turning waves and multiple reflections are correctly reconstructed. Numerical examples show that this method can significantly enhance the imaging of an overhanging salt boundary and vertical faults.

The Prior Art

Conventional one-way wave equation migration has been successfully and widely applied to 3D pre-stack depth imaging for years. This method recursively downward continues source and receiver wavefields independently. It handles primary reflections but ignores the turning waves that propagate beyond 90° and multiple reflections, such as duplex waves that describe propagation paths with a double reflection involving a reflecting base boundary and a near vertical feature. It fails to produce good images of the geologic structure that contains strong turning waves and duplex waves, such as an overhanging salt boundary and geological structure with steep dip. Based on the two-way hyperbolic wave equation, reverse-time migration propagates the source wavefield forward and the receiver wavefields backward in time. Reverse-time migration has no dip limitation and also images most wave types, including turning waves and duplex waves. A properly designed imaging condition is critical to suppress the artifacts in prestack reverse-time migration. However, it is computationally expensive in that it demands huge storage and memory capabilities for large 3D datasets.

The Kirchhoff migration can handle the turning waves. Ratcliff et al. used the Kirchhoff integral method for imaging salt structures in the Gulf of Mexico ("Seismic Imaging of Salt Structures In the Gulf of Mexico," *The Leading Edge* 11(4), 15-31, 1992). Reverse-time migration (Baysal, et al, "Reverse Time Migration," *Geophysics* 48(11), 1514-1524, 1983; Biondi et al., Prestack "Imaging of Overturned Reflections by Reverse Time Migration", *Expanded Abstracts, SEG 72$^{nd}$ Annual Meeting* 1284-1287, 2002) takes into account the turning waves, but it is usually computationally too expensive for practical applications.

One-way wave equation migration has been successfully and widely applied to 3D pre-stack depth imaging for years (O'Brien et al, "Wave Equation Pre SDM Advances Subsalt Imaging", *Offshore* March, 2002, 36-40). Traditional one-way wave equation migration recursively downward continues source and receiver wave fields independently. It ignores the waves that propagate beyond 90°, stated as evanescent energy. In fact, the evanescent energy propagates upward and is received by geophones at the surface. Especially for those areas with a significant velocity gradient along depth, this part of energy can be record as the turning waves.

Claerbout ("Imaging the Earth's Interior," *Blackwell Scientific Publications,* 1985, p. 272-273) proposed a two-pass phase shift, post-stack time migration for imaging turning waves. Since turning waves have abnormal moveout that degrades the images quality after normal move and (NMO) stack, this method has not been widely practiced. Hale et al., ("Imaging Salt Substructures With Turning Seismic Waves," *Geophysics,* 57(11), 1453-1462, 1992) extended Claerbout's algorithm by pre-computing and tabulating phase shifts as a function of depth and reflection slope to avoid the upward-pass continuation. They also demonstrated how to preserve turning waves during stacking of seismic data to make the algorithm more useful.

Another option to migrate turning waves using one-way propagators is to extrapolate wave field along horizontal (Zhang J. et al, "Turning Wave Migration by Horizontal Extrapolation," *Geophysics* 62(1), 291-296, 1997) or tilted coordinates (Shan G. et al, "Imaging Overturned Waves by Plane-Wave Migration in Titled Coordinates," *Expanded Abstracts,* SEG 73$^{nd}$ Annual Meeting, 1067-1070, 2004; and Crawley et al, "DSR Wave-Equation Migration for Steep and Overturned Events," *Expanded Abstracts,* SEG 75$^{th}$ Annual Meeting, 2005). The implementation based on this strategy is complicated for 3D cases. Also the lateral velocity variations tend to be stronger at the subsurface image point in the new coordinates.

The approach proposed is an extension of Claerbout's method based on the following aspects: Extend from post-stack time migration to prestack depth migration to avoid loss of turning waves in the stack stage; Use more accurate propagators, such as generalized screen propagators (GSP) (Jin, S., Wu, R. S. et al, "Prestack Depth Migration Using a Hybrid Pseudo-Screen Propagator," *Expanded Abstracts,* SEQ 68$^{th}$ Annual Meeting, 1819-1822, 1998; Jin and Walraven, "Wave Equation GSP Prestack Depth Migration and Illumination," *The Leading Edge,* 22, 604-610, 2003) and velocity-adaptive-coordinate-transform VAVT (Xu, S. et al, "One-way Wave-field Extrapolation Via Velocity Adaptive Coordinate Transform," *Expanded Abstracts,* SEG 73$^{rd}$ Annual Meeting, 1067-1070, 2003) instead of phase-shift, to handle steep deeps with strong lateral velocity variations; and Design a specific imaging condition to obtain the image volumes contributed from different wave patterns.

U.S. Pat. No. 5,138,584 to Hale describes a method for migrating seismic data for formations that are located in geological media that cause seismic waves to be refracted so substantially that the waves turn upward. The method includes the steps of tabulating a first phase shift function as a function of the wave vector and the angular frequency of seismic waves in the geological media, tabulating a second phase shift function, storing the tabulated values of the first and second phase shift functions, calculating a third phase shift function based upon the first and second phase shift functions; and migrating recorded seismic data using the first, second and third phase shift functions.

U.S. Pat. No. 5,274,605 to Hill describes a process for depth migration of seismic wave information that has been derived from geological media that causes rapid lateral velocity variations in seismic waves. The process includes the step of decomposing waves fields recorded at the earth's surface using Gaussian beams as basic functions. Then, according to the process, the set of Gaussian beams is extrapolated downward into the earth to obtain the subsurface wave field. Finally, the wave field is processed to provide depth-migated images of subsurface reflectors.

U.S. Pat. No. 5,490,120 to Li et al describe an overturned wave identified in initial seismic data and revised seismic data gathering parameters are calculated (e.g., a range of locations for a seismic source and detectors laterally displaced from the source). The gathered seismic data is used to image the interface by using an imaging algorithm capable of migrating down going and upcoming reflections.

U.S. Pat. No. 5,530,679 to Albertin describes an approximation method for imaging seismic data that originates from steeply dipping or overturned strata. The method provides a viable alternate approach to the generalized f-k migration that does not relay explicitly on some form of pertubation series expansion and thus avoids the steep-dip instability that is present in previously-known methods. This method is particularly useful in the presence of a moderate lateral velocity gradient, something that prior-art methods have trouble accommodating. An advantageous feature of the disclosed method is that the migration/imaging operators are composed of simple numerical coefficients.

Duplex waves describe propagation paths with a double reflection involving a reflecting base boundary and a near vertical feature (Marmalyeyskyy, et al., "Migration of Duplex Waves," *Expanded Abstracts*, SEG 75$^{th}$ Annual Meeting, 2005. Duplex waves exist in the geologic structure with vertical features such as faults and flank of salt bodies. In this case, primary reflections may not be recorded in a limited acquisition aperture. Therefore, one-way wave equation migration cannot produce the image of such events. Instead, doubly reflected duplex waves are recorded and should be taken into account in the migration. Migration of duplex waves can be conducted by Kirchhoff method. Marmalyeyskyy et al (2005) showed impressive results for imaging of the steep salt dome boundary and vertical fault. Due to the high frequency asymptotic approximation, the Kirchhoff method, however, has fundamental limitations in producing good subsurface images in complex media. Based on the concept of multiple fore-scattering, single back-scattering (MFSB) in heterogeneous medium, the present method uses a one-return wave equation migration that downward and upward extrapolates both down-going and up-going waves. Followed by a properly designed imaging condition, one-return migration produces the depth image of primary reflections that is same as conventional one-way equation migration as well as the image from the contribution of turning waves and duplex waves that one-way methods fail to handle.

SUMMARY OF THE INVENTION

Conventional one-way wave equation migration has been widely applied to prestack depth imaging. Both source and receiver wavefields are recursively downward continued with a convolution imaging condition at each depth level. The one-way propagator handles primary reflections, but neglects turning waves, multiples and other multiple reflections, such as duplex waves. Based on the concept of multiple fore-setting and single back-scattering, one-return wave equation migration extrapolates both down-going and up-going waves. Followed by a properly designated imaging condition, one-return migration produces the depth image of primary reflections that is same as one-way migration as well as the image from the contribution of duplex waves. Synthetic examples are presented to demonstrate the unique capability of this approach to image the vertical features. The approach of the present invention is basically to obtain four volumes of wave field $P_{SD}(x,y,z,\omega)$, $P_{RD}(x,y,z,\omega)$, and $P_{RU}(x,y,z,\omega)$, where $\omega$ is frequency and the subscripts S and R indicate source and receiver side, D and U represent down-going and up-coming wavefields, respectively. After applying the certain imaging condition to each source-receiver wave field pair, we have the following volumes:

$$I_{DD}(x,y,z)=\Sigma_\omega P_{SD}(x,y,z,\omega)P^*_{RD}(x,y,z,\omega)$$

$$I_{UU}(x,y,z)=\Sigma_\omega P_{SU}(x,y,z,\omega)P^*_{RU}(x,y,z,\omega)$$

$$I_{DU}(x,y,z)=\Sigma_\omega P_{SD}(x,y,z,\omega)P^*_{RU}(x,y,z,\omega)+\Sigma_\omega P_{SU}(x,y,z,\omega)P^*_{RD}(x,y,z,\omega)$$

where, * indicates conjunction of complex data. $I_{DD}$ is the imaging condition for down-/down-going waves for both source and receiver that is the same as the traditional one-way wave equation migration. $I_{DU}$ is the imaging condition for down-/up- and up-/down-going waves for respective source and receiver that handles the duplex waves. $I_{UU}$ is the imaging condition for up-/up-going waves that actual image the multiples. The final image can be obtained by the summation of these partial image volumes.

BRIEF DESCRIPTION OF THE DRAWINGS

The present invention will now be described with reference to the accompanying drawings, in which.

DETAILED DESCRIPTION OF THE INVENTION

Figure 1:
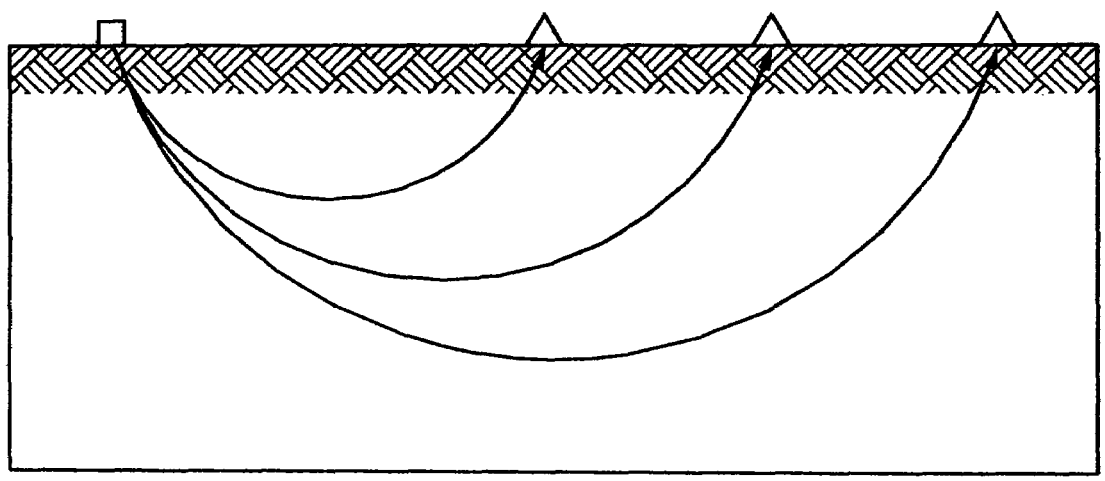
FIG. 1 is a schematic representation of non-reflected turning wave.

Turning waves are commonly recorded, at the surface, from a geologic structure where the velocity increases with depth. If the turning waves are not reflected from an interface with impedance contrast (FIG. 1), there's no contribution from the image of subsurface structure. If the turning waves occur before (or after) reflection from the interface, such as the overhanging salt flanks (FIG. 2) or vertical features, the turning waves may have a significant contribution to the image of such events.

Figure 2:
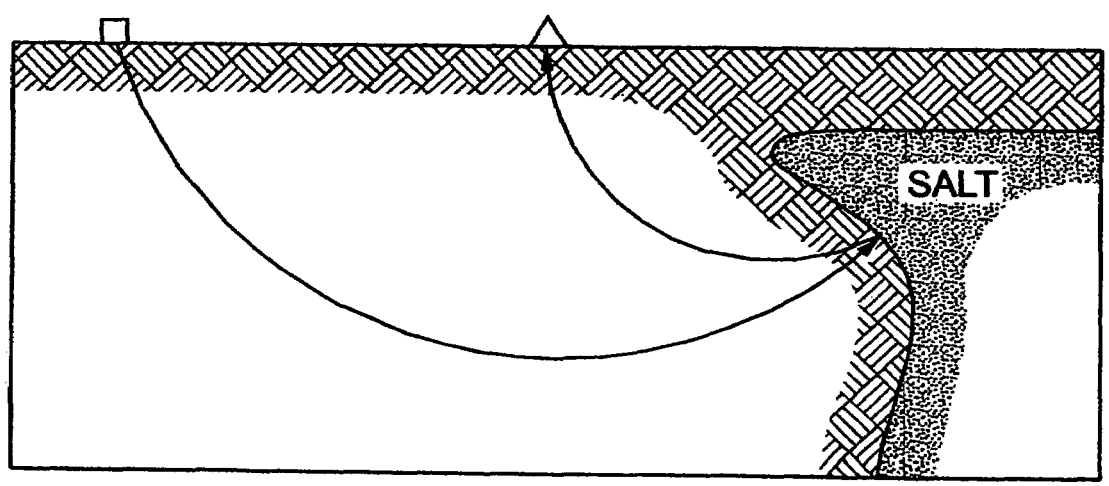
FIG. 2 is a schematic representation of reflected turning waves when the sediment velocity increases with depth.

In short-profile migration, a two-pass extrapolation, is used for both source and receiver wave fields. During the first-pass downward extrapolation, the turning wave energy at each depth z is saved for the second-pass extrapolation. The second-pass extrapolation reconstructs the contribution from the turning wave. We now obtain four volumes of wave field: $P_{SD}(x,y,z,\omega)$; $P_{SU}(x,y,z,\omega)$; $P_{RD}(x,y,z,\omega)$; and $P_{RU}(x,y,z,\omega)$, where $\omega$ is frequency and the subscripts S and R indicate source and receiver sides, respectively, and the subscripts D and U represent down-going and up-coming wave fields, respectively. After applying the certain imaging condition to each source-receiver wave field pair, we have the following volumes:

$$I_{DD}(x,y,z)=\Sigma_\omega P_{SD}(x,y,z,\omega)P^*_{RD}(x,y,z,\omega) \quad [1]$$

$$I_{UU}(x,y,z)=\Sigma_\omega P_{SU}(x,y,z,\omega)P^*_{RU}(x,y,z,\omega) \quad [2]$$

$$I_{DU}(x,y,z)=\Sigma_\omega P_{SD}(x,y,z,\omega)P^*_{RU}(x,y,z,\omega)+\Sigma_\omega P_{SU}(x,y,z,\omega)P^*_{RD}(x,y,z,\omega) \quad [3]$$

where * indicates conjunction of complex data. This imaging condition is illustrated in FIG. 2. Here, $I_{DD}$ is the same as the image by traditional one-way wave equation migration. $I_{UU}$ is the image contributed from turning waves of both source and receiver side that enhances the overhanging salt flanks. $I_{DU}$ is the image contributed from turning/non-turning waves that enhances the vertical/nearly-vertical structures. The final image can be obtained by the summation of these partial image volumes.

Figure 3:
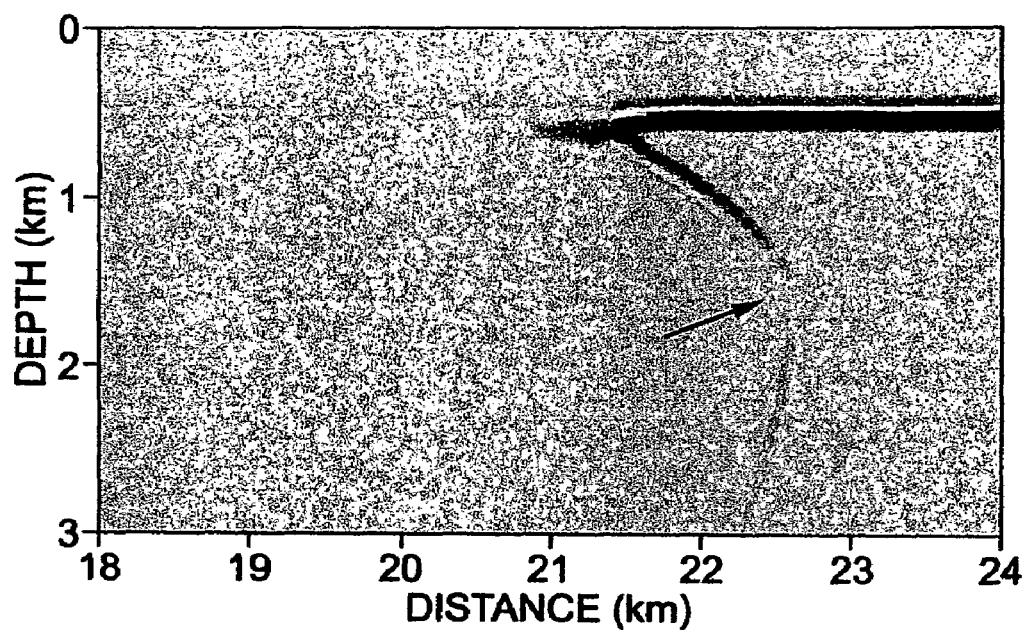
FIG. 3 is a depth image by a conventional one-way wave equation migration.

To simulate the offshore sediment-salt geologic structure in Gulf of Mexico, we designed an overhanging salt flank model to test our turning wave prestack depth migration method. FIG. 3 shows the middle part of the full model, which extends from 0 to 40 km horizontally and from 0 to 3.5 km in depth. The depth of the sea bottom is 500 meters, the sediment velocity starts from 1500 m/s and increases along depth with a constant gradient of 1.0 s$^{-1}$. The velocity of a salt dome is 4500 s/m.

Figure 4:
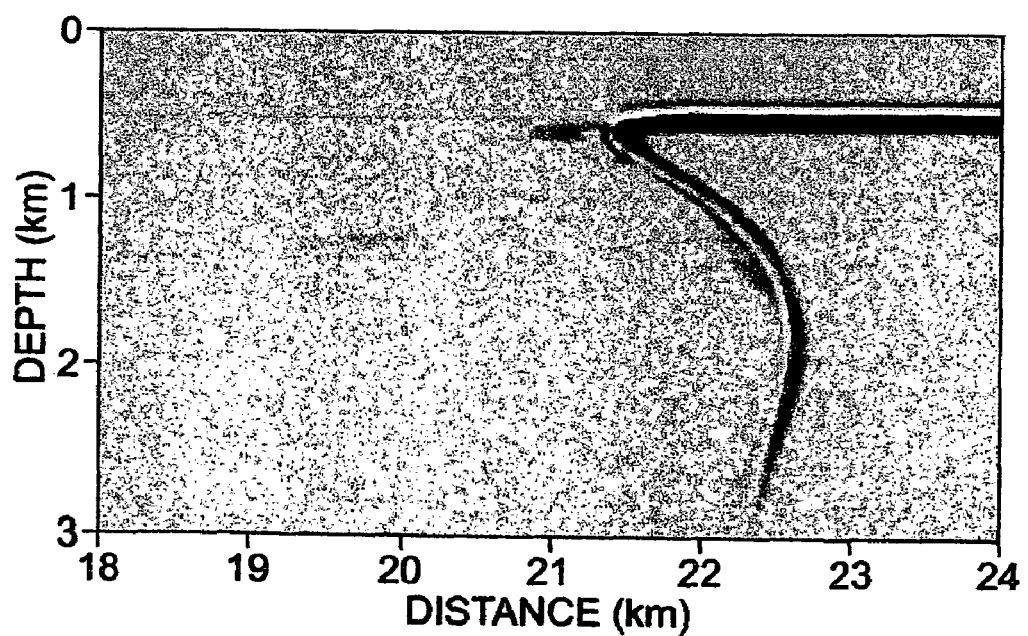
FIG. 4 is a depth image by the subject method that handles the turning wave to enhance the image of an overhanging salt boundary.

We generated the synthetic data set with a high-order finite difference approach. This data set included 450 shots, whose locations start from 11 km with an increment of 40 km, and each shot includes 2001 channels with the offset range from −10 km to 10 km. FIG. 4 shows one shot gather. The shot point is located at 20 km as marked with an arrow in FIG. 3.

Figure 5:
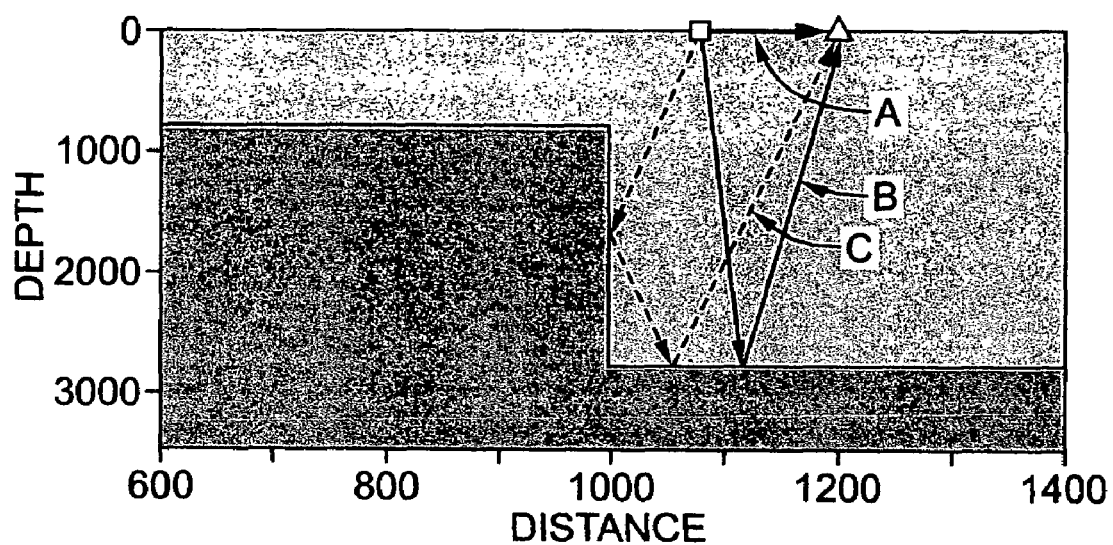
FIG. 5 is a schematic representation of a vertical boundary and base reflector interface.

We migrated all the 450 shot synthetic data using a shot profile GSP migration. FIG. 5 shows the migration result obtained by using a downgoing-source/downgoing-receiver imaging condition, as $I_{DD}$ defined by Equation (1) and illustrated in FIG. 2. This is the same imaging condition used in conventional one-way wave equation migration. As expected, part of the overhanging salt flank is not well imaged because of ignoring turning waves during wave field extrapolation.

We also migrated turning waves using the two-pass approach by down-up-ward extrapolations. The migration result is shown in FIG. 4. Contribution from the turning waves significantly enhances the image of an overhanging salt boundary.

Figure 6:
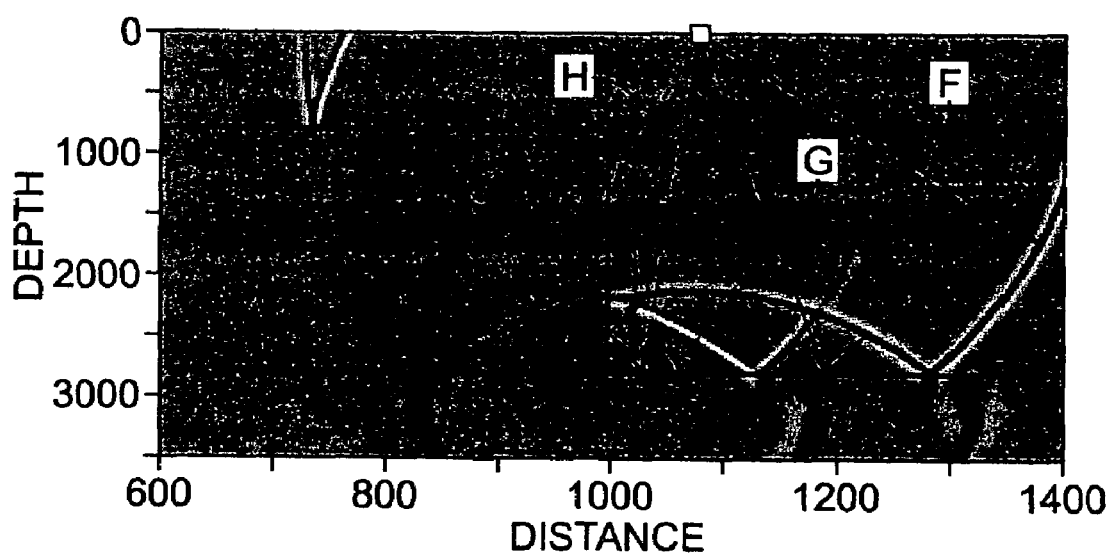
FIG. 6 is a schematic representation of different paths for direct arrivals indicated by F, primary reflections indicated by G, and duplex waves indicated by H.

We simulated a synthetic model with a vertical boundary and a base reflector interface by full-wave acoustic finite difference modeling. FIG. 5 shows the velocity model. The velocity is 1500 m/s for above the boundary and 4500 m/s below the boundary. Two hundred shots are modeled with a 40 m interval. One thousand receivers were recorded with the offset range from −5000 to 5000 m. The key ray paths are shown for the shot at CDP location 1080. The direct arrival is indicated by A, primary reflections from the base reflector interface are indicated by B, and the doubly reflected duplex wave against the vertical boundary and the base reflector interface are indicated by C. The key ray paths exactly follow the wavefronts for these wave modes as indicated by F, G and H in FIG. 6.

Figure 7A:
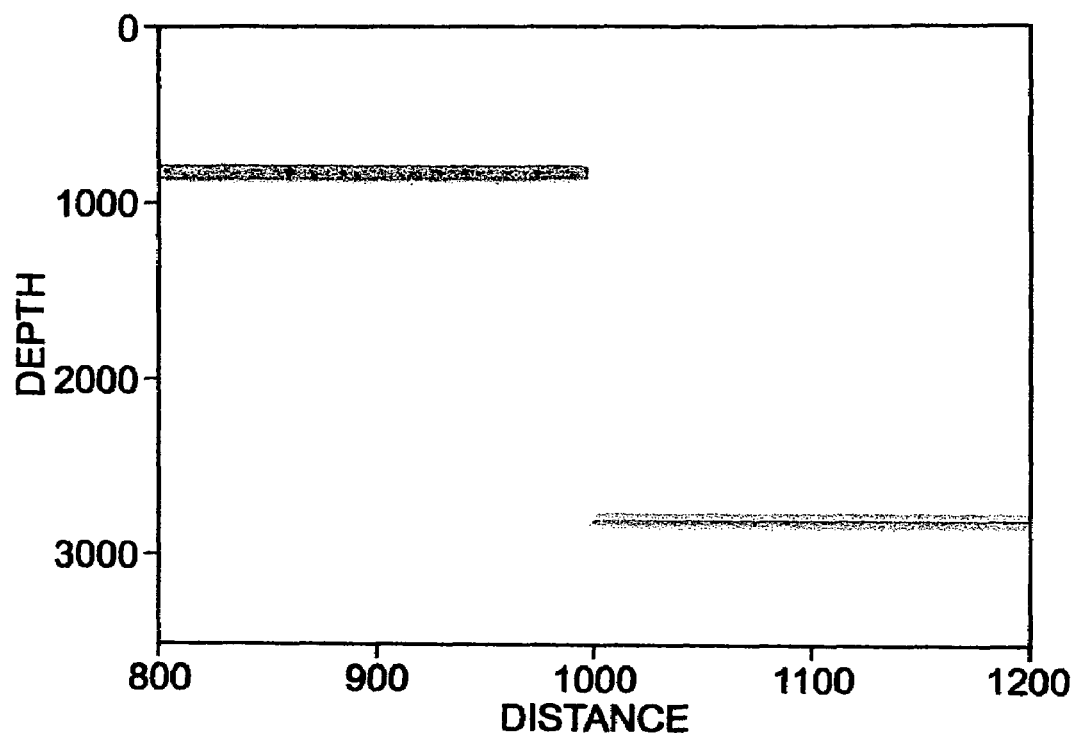
FIG. 7A is a depth image by a conventional one-way equation migration.
Figure 7B:
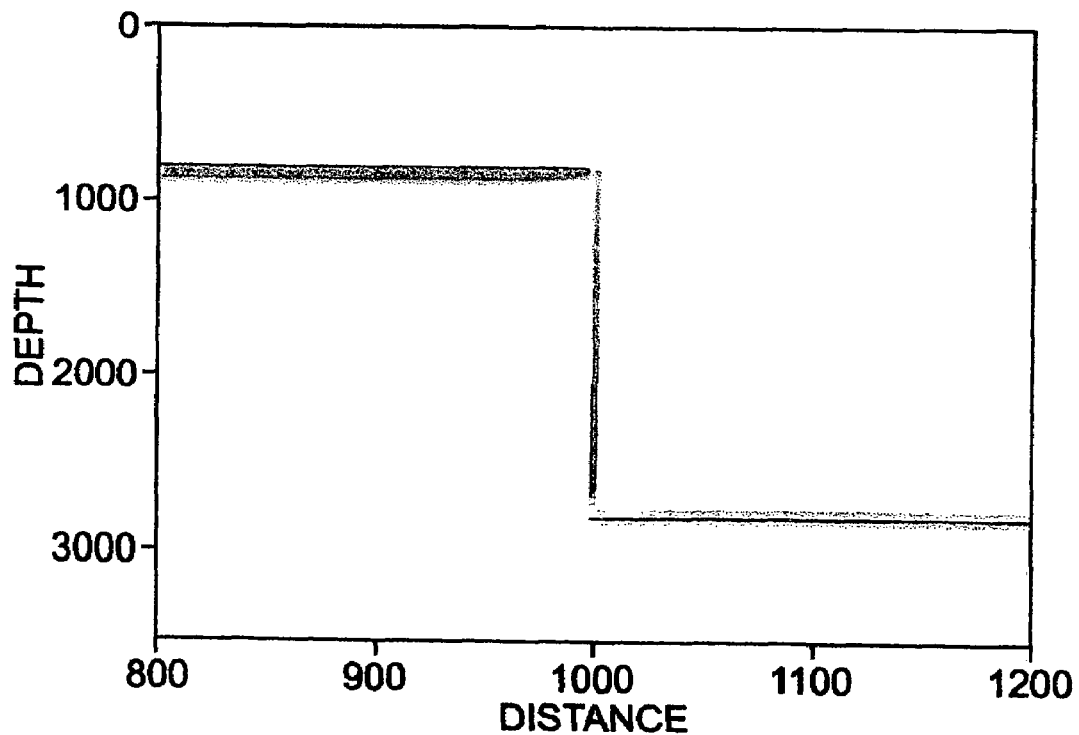
FIG. 7B is a depth image by the subject method that handles duplex waves to correctly reconstruct the vertical feature.

FIGS. 7A and 7B show a comparison between one-way and one-return prestack migrations. FIG. 7A is the depth image migrated by conventional one-way wave equation migration. The flat events are well imaged. However, the vertical boundary has totally disappeared on the image. After summing the two partial images, the final depth image as shown in FIG. 7B exactly reconstruct the geologic events.

In some geologic structures, where sediment velocity increases with depth, turning waves are commonly recorded and are helpful for imaging the vertical and overhanging salt flanks. Conventional one-way wave equation migration method ignores the turning waves that propagate beyond 90° and therefore degrade the image from the contributions of such wave types. The subject method uses a two-pass by down-/up-ward extrapolation to handle turning waves for prestack depth migration. Combined with properly designed imaging conditions, this approach produces various partial image volumes that are contributed from different kinds of wave types. These partial image volumes can be interpreted separately. Tests on a synthetic data set shows that this approach correctly handles turning waves and produces superior image results of overhanging salt flank over the conventional one-way wave equation.

Conventional one-way wave equation migration usually handles the primary reflections. It ignores the double reflections, resulting in the failure of imaging vertical features recorded as duplex waves. One-return wave equation migration extrapolates both down-going and upgoing waves. By applying properly designed imaging conditions for different wave modes, this method produces the partial image from down-/down-going wavefields of both source and receiver, which is same as the conventional one-way migration, as well as the partial image from down/up-going wavefields of respective source and receiver contributed by duplex waves. An experiment on a synthetic dataset shows that duplex waves exist in a geologic structure with a vertical boundary and a base reflection interface. Duplex waves have to be considered to reconstruct the vertical features in prestack depth migration.

The present invention may be subject to many modifications and changes without departing from the spirit or essentially characteristics thereof. The present embodiment should therefor be considered in all respects as illustrative and not restrictive of the scope of the subject invention as defined by the appended claims.

We claim:

1. A method of seismic imaging overhanging subsurface structures, comprising the steps of:

initiating a seismic source to generate seismic waves in a geologic medium which refracts the waves such that the waves, which initially travel downward from the seismic source, turn to permit the seismic waves to contact and be reflected from surfaces beneath overhanging subsurface structures which reflect the refracted waves such that the reflected waves turns as the reflected seismic waves travel through the geological medium;

performing a two-pass approach by down-/up-ward extrapolation for both source and receiver wave fields, during the first-pass downward extrapolation, the turning wave energy at each depth z is saved for the second-pass extrapolation, the second-pass extrapolation reconstructs the contribution from the turning wave thereby obtaining four volumes of wave field $P_{SD}(x,y,z,\omega)$, $P_{SU}(x,y,z,\omega)$, $P_{RD}(x,y,z,\omega)$, and $P_{RU}(x,y,z,\omega)$, where ω is frequency and the subscripts S and D indicate source and receiver side, D and U represent down-going and up-coming wave fields, respectively, and after applying the certain imaging condition to each source-receiver wave field pair, arriving at the following volumes:

$$I_{DD}(x,y,z)=\Sigma_\omega P_{SD}(x,y,z,\omega)P^*_{RD}(x,y,z,\omega)$$

$$I_{UU}(x,y,z)=\Sigma_\omega P_{SU}(x,y,z,\omega)P^*_{RU}(x,y,z,\omega)$$

$$I_{DU}(x,y,z)=\Sigma_\omega P_{SD}(x,y,z,\omega)P^*_{RU}(x,y,z,\omega)+\Sigma_\omega P_{SU}(x,y,z,\omega)P^*_{RD}(x,y,z,\omega)$$

where * indicates conjunction of complex data.

2. A method of seismic imaging overhanging subsurface structures, comprising the steps of:

initiating a seismic source to generate seismic waves in a geologic medium which refracts the waves such that the waves, which initially travel downward from the seismic source, turn to permit the seismic waves to contact and be reflected from surfaces beneath overhanging subsurface structures which reflect the refracted waves such that the reflected waves turns as the reflected seismic waves travel through the geological medium to create a data set;

obtaining four partial image volumes depending on the propagation directions of source and receiver, $P_{SD}(x,y,z,\omega)$, $P_{SU}(x,y,z,\omega)$, $P_{RD}(x,z,y,\omega)$ and $P_{RU}(x,z,y,\omega)$, where $\omega$ is frequency and the subscripts S and R indicate source and receiver side, D and U represent down-going and up-coming wavefields, respectively; and expressing corresponding imaging conditions for these wave modes as:

$$I_{DD}(x,y,z)=\Sigma_\omega P_{SU}(x,y,z,\omega)P^*_{RD}(x,y,z,\omega) \quad (1)$$

$$I_{UU}(x,y,z)=\Sigma_\omega P_{SD}(x,y,z,\omega)P^*_{RU}(x,y,z,\omega) \quad (2)$$

$$I_{DU}(x,y,z)=\Sigma_\omega P_{SD}(x,y,z,\omega)P^*_{RU}(x,y,z,\omega)+\Sigma_\omega P_{SU}(x,y,z,\omega)P^*_{RD}(x,y,z,\omega) \, (1) \quad (3)$$

where * indicate conjunction of complex data, $I_{DD}$ is the imaging condition for down-/down-going waves for both source and receiver, $I_{DU}$ is the imaging condition for down-/up- and up-/down-going waves for respective source and receiver that handles the duplex waves; and summing these partial image volumes to obtain the final image.

3. The method according to claim 2 wherein said data set includes at least 450 shots at locations starting from 11 km with an increment of 40 km, and each shot includes at least 2000 channels with an offset range from −10 km to 10 km.

4. The method according to claim 2 wherein all said data is migrated using a shot profile generalize screen propagators (GSP) migration to obtain a migration result by using a down-going-source/downgoing-receiver imaging condition, as $I_{DD}$ defined by $I_{DD}(x,y,z)=\Sigma_\omega P_{SU}(x,y,z,\omega)P^*_{RD}(x,y,z,\omega)$.

5. The method according to claim 2 wherein turning waves were migrated using the two-pass approach.

6. The method according to claim 2 wherein a model with a vertical boundary and a base reflector interface by full-wave acoustic finite difference modeling is simulated and wherein the velocity is 1500 m/s for above the boundary and 4500 m/s below the boundary.

7. The method according to claim 2 wherein two hundred shots are modeled with a 40 m interval.

8. The method according to claim 2 using one thousand receivers with an offset range from −5000 to 5000 m.

9. A method of seismic imaging of overhanging subsurface structures using a two-pass scheme to handle turning waves for prestack depth migration to produce partial image volumes that are contributed from different kinds of waves, comprising the steps of:

utilizing a plurality of seismic sources and a single seismic receiver to create a data set including double reflections recorded as duplex waves; and extrapolating both down-going and upgoing waves to produce partial images from down/down-going wavefields of both source and receiver, as well as the partial image from down/up-going wavefields of respective source and receiver contributed by duplex waves.

10. The method according to claim 9 further comprising the step of obtaining four partial image volumes depending on the propagation directions of source and receiver, $P_{SD}(x,y,z,\omega)$, $P_{SU}(x,y,z,\omega)$, $P_{RD}(x,z,y,\omega)$ and $P_{RL}(x,z,y,\omega)$, where $\omega$ is frequency and the subscripts S and R indicate source and receiver side, D and U represent down-going and up-coming wavefields, respectively; and expressing corresponding imaging conditions for these wave modes as:

$$I_{DD}(x,y,z)=\Sigma_\omega P_{SU}(x,y,z,\omega)P^*_{RD}(x,y,z,\omega) \quad (1)$$

$$I_{UU}(x,y,z)=\Sigma_\omega P_{SD}(x,y,z,\omega)P^*_{RU}(x,y,z,\omega) \quad (2)$$

$$I_{DU}(x,y,z)=\Sigma_\omega P_{SD}(x,y,z,\omega)P^*_{RU}(x,y,z,\omega)+\Sigma_\omega P_{SU}(x,y,z,\omega)P^*_{RD}(x,y,z,\omega) \, (1) \quad (3)$$

where * indicates conjunction of complex data, $I_{DD}$ is the imaging condition for down-/down-going waves for both source and receiver, $I_{DU}$ is the imaging condition for down-/up and up-/down-going waves for respective source and receiver that handles the duplex waves; and summing these partial image volumes to obtain the final image.

* * * * *